(12) United States Patent
Medlin, Jr.

(10) Patent No.: US 9,136,681 B1
(45) Date of Patent: Sep. 15, 2015

(54) STABILIZED BRACKET FOR HOLDING CONDUCTORS A FIXED DISTANCE FROM A WALL SURFACE

(71) Applicant: Lewis B. Medlin, Jr., Vinton, VA (US)

(72) Inventor: Lewis B. Medlin, Jr., Vinton, VA (US)

( * ) Notice: Subject to any disclaimer, the term of this patent is extended or adjusted under 35 U.S.C. 154(b) by 0 days.

(21) Appl. No.: 14/311,256

(22) Filed: Jun. 21, 2014

(51) Int. Cl.
*F16L 3/02* (2006.01)
*F16L 3/23* (2006.01)
*H02G 3/32* (2006.01)
*F16L 3/233* (2006.01)
*F16L 3/10* (2006.01)
*F16L 3/22* (2006.01)
*H02G 3/12* (2006.01)

(52) U.S. Cl.
CPC ........ *H02G 3/32* (2013.01); *F16L 3/233* (2013.01); *F16L 3/02* (2013.01); *F16L 3/105* (2013.01); *F16L 3/22* (2013.01); *H02G 3/126* (2013.01)

(58) Field of Classification Search
CPC .............. F16L 3/00; F16L 3/08; F16L 3/22; F16L 3/02; F16L 3/233; F16L 3/2338; H02G 3/22; H02G 3/126; H02G 3/26; H02G 3/32
USPC ........... 174/480, 481, 503, 663, 668, 669, 49, 174/65 R, 68.1, 70 C; 248/65, 68.1, 73, 56, 248/300, 74.3; 52/220.7, 715
See application file for complete search history.

(56) References Cited

U.S. PATENT DOCUMENTS

| | | | |
|---|---|---|---|
| 4,964,525 A * | 10/1990 | Coffey et al. | 220/3.9 |
| 4,971,280 A * | 11/1990 | Rinderer | 248/228.7 |
| 5,067,677 A | 11/1991 | Miceli | |
| 5,141,185 A | 8/1992 | Rumbold et al. | |
| 5,587,555 A | 12/1996 | Rinderer | |
| 8,371,540 B1 * | 2/2013 | Medlin, Jr. | 248/68.1 |
| 8,376,927 B2 * | 2/2013 | Tovar Lopez | 600/16 |
| 8,387,927 B1 | 3/2013 | Medlin, Jr. | |
| 8,496,211 B2 * | 7/2013 | Rinderer | 248/65 |
| 8,746,633 B1 | 6/2014 | Medlin, Jr. | |

* cited by examiner

*Primary Examiner* — Tan Le
(74) *Attorney, Agent, or Firm* — Michael R. Philips

(57) ABSTRACT

A bracket for holding conductors at a selected distance from the surface of a wall board to be mounted to a building stud. The bracket has a channel formed between a pair of plates and a bendable strap for closing the channel. The strap has an angularly oriented return to engage a side wall and a locking tab to hold the strap in closed position. The channel width is adjustable to accommodate different sized conductors. One of the plates has a bend line for adjusting the total width of the bracket for mounting on a narrower stud.

20 Claims, 3 Drawing Sheets

STABILIZED BRACKET FOR HOLDING CONDUCTORS A FIXED DISTANCE FROM A WALL SURFACE

FIELD OF THE INVENTION

The present invention relates to the field of wiring support devices for use in building construction, and more particularly to a bracket for positioning one or more conductors at a predetermined distance from a wall surface.

BACKGROUND OF THE INVENTION

The National Electrical Code (NEC) requires that electrical wires and cables mounted within a wall structure must be at least one-and-one-quarter (1.25) inches behind the inner surface of the wall board. This code provision is intended to reduce the likelihood that a nail or other sharp implement would penetrate or damage the conductor insulation and potentially cause an electrical fire. The NEC further requires that a cable is secured at the 1.25 inch offset within 12 inches of an electrical junction box or other fitting, and at intervals of not more than 4.5 feet along a wire run.

A number of devices have been developed to implement the NEC requirement for a 1.25 inch offset, as described in the following exemplary patents:

U.S. Pat. No. 5,067,677 to Miceli is for a Wire Harness. This device is to be mounted on the face of a wall stud for holding a number of wires between the surfaces of a wall. The device has one arm for mounting to a stud and a second arm for attaching wires. A series of clips are placed along the second arm for receiving and holding wires.

U.S. Pat. No. 5,141,185 to Rumbold et al. is for a Wiring Clip. This patent discloses a clip having an L-shaped portion to be secured to a stud and a strut and hinged arm remote from the L-shaped portion, the arm is adapted for being folded and locked around several wires.

U.S. Pat. No. 5,587,555 to Rinderer is for a Conductor Holding Device. This conductor holder has a support member having two perpendicular arms, one arm for being affixed to a stud and the other arm being formed with one or more holes. A clamp having a leg and a head is mounted with the leg through the one hole in the arm and the head holding the conductor at a fixed distance from a wall surface.

U.S. Pat. No. 8,371,540, U.S. Pat. No. 8,387,927 and U.S. Pat. No. 8,746,633 to the present inventor are each for Cable Positioning Brackets. These three patents represent earlier inventions of brackets for holding a series of conductors at a selected distance from a wall surface.

U.S. Pat. No. 8,496,211 to Rinderer is for a Self-Correcting Conductor Positioning Bracket. This bracket includes a mounting portion shaped to permit fastening to a wall stud and an angularly oriented support portion for contacting the wall stud to resist displacement of the bracket. The conductor is placed in an aperture between a retainer plate and a positioning plate, the aperture being closed by a closing member.

SUMMARY OF THE INVENTION

The present invention provides a stabilized bracket for holding conductors a fixed distance from a wall surface. The bracket has an anchor plate for attachment to a first surface of a building stud and a foot plate to brace against a second surface of the building stud, the foot plate being perpendicular to the anchor plate for stabilizing the bracket against being twisted relative to the stud. The conductors are held in a channel running perpendicular to the second surface of the stud between a fixed barrier and a moveable jaw. A first end of the channel terminates at the foot plate braced against the stud and a second end of the channel is closeable with a bendable strap. The strap has a stabilizing return and a slot for engaging a locking tab at an outer end, the return and the tab effectively locking the bracket into a stabilized conductor support.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
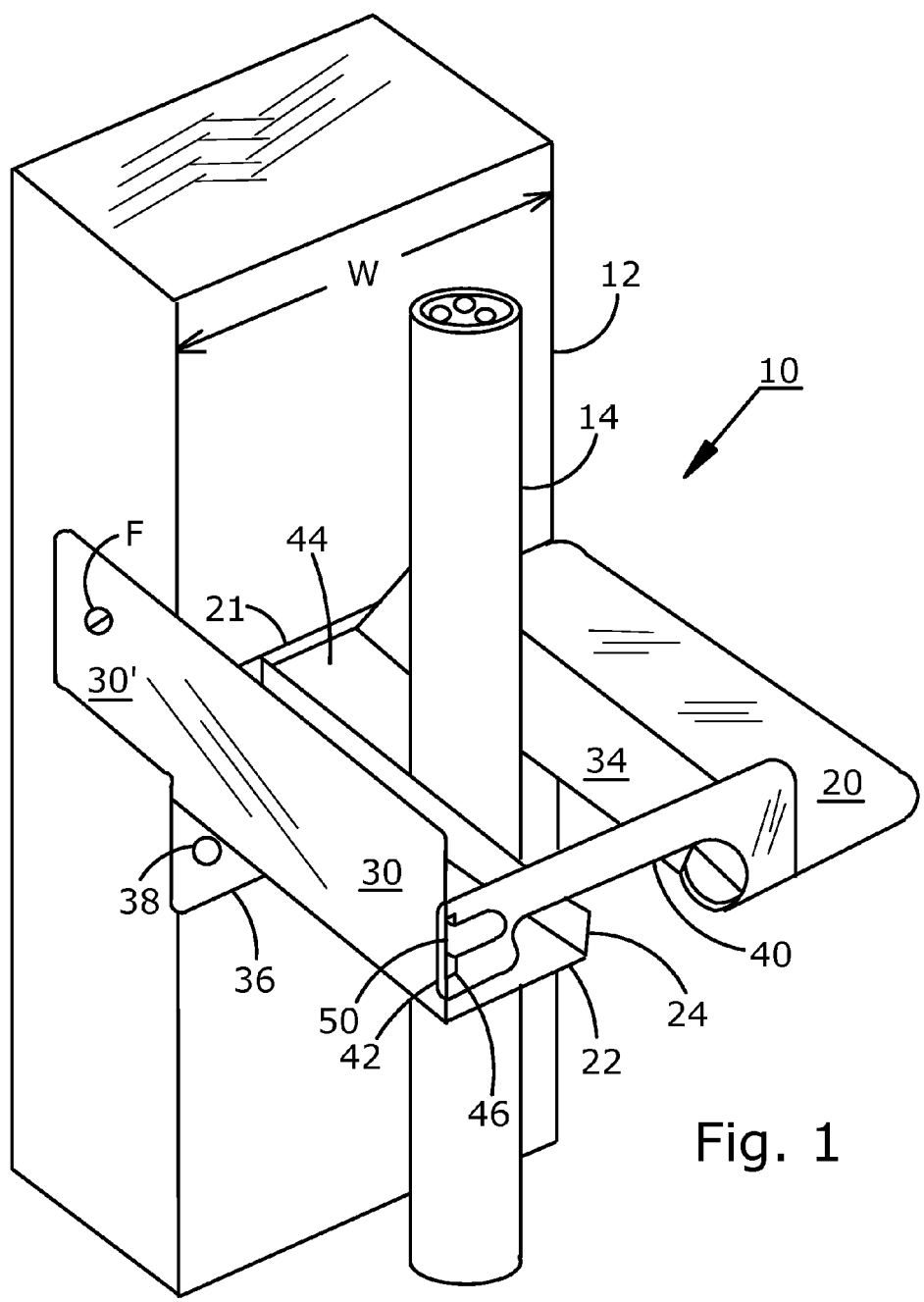
FIG. 1 is a perspective view of the bracket of the present invention mounted to a building stud.

Referring to FIG. 1, the stabilized bracket 10 of the present invention is shown in perspective as mounted to a building stud 12. As used herein, the term "stabilized" means being relatively rigid and resistant to bending or other distortion. A first plate 20 is oriented substantially horizontally at a first side of bracket 10 and a second plate 22 on a second side, first plate 20 and second plate 22 being connected by a bridge 21. First plate 20, bridge 21 and second plate 22 are substantially coplanar. A wall 30 extends upwardly from second plate 22 with an anchor plate 30' extending from wall 30 to overlap a portion of stud 12. A fastener F is inserted through a hole in anchor plate 30' to securely hold bracket 10 to the narrow side of stud 12. A planar foot 36 extends downwardly from second plate 22, bridge 21 and a portion of first plate 20 to brace against stud 12. As illustrated, with anchor plate 30' secured to the narrow surface of stud 12 and foot 36 braced against the broad surface of stud 12, bracket 10 is securely supported in substantially horizontal orientation and is highly resistant to being moved or distorted. Optionally, a second fastener can be inserted into the wide surface of stud 12 through a hole 38 provided through foot 36. Whereas bracket 10 is shown being mounted to stud 12 with anchor plate 30' upward and foot 36 downward of first plate 20 and second plate 22, it is understood that mounting bracket 10 in a different orientation, e.g. with anchor plate 30' facing down and foot 36 facing up would not depart from the spirit and objectives of the invention.

Referring further to FIG. 1, a vertically oriented barrier 24 is formed at an edge of second plate 22 opposite to the position of wall 30 and substantially parallel thereto. A jaw member 34 is flexibly mounted to an edge of first plate 20 in a position opposite to barrier 24, defining a channel 44 between barrier 24 and jaw member 34. Channel 44 is configured for receiving and holding one or more conductors 14 between barrier 24 and jaw 34 as will be discussed further below. While conductor 14 is illustrated as the type of cable having an extruded plastic jacket, the present invention is equally adapted to support conductors of the type having a helical metallic jacket.

Referring further to FIG. 1, a strap 40 is fixedly connected at one end to first plate 20. Strap 40 extends across the open end of channel 44. A slot 46 is formed through the second end of strap 40 and a return 42 is formed to reside at an angle to the length of strap 40 at a position beyond slot 46. According to the preferred embodiment of the invention, return 42 is oriented at a 90° angle to the length of strap 40. When strap 40 is closed across channel 44, return 42 is in contact with the outer surface of wall 30. A locking tab 50 passes through slot 46 and is bent to retain strap 40 in closed condition. While locking tab 50 is shown bent along the length of strap 40, it will be understood that the same resultant securing of strap 40 is accomplished if locking tab 50 were bent to lie along the outer surface of wall 30. Bracket 10 is formed with a horizontal width substantially equal to the width W of stud 12, providing further stabilization to bracket 10 when sheet rock wall board is attached on both sides of stud 12 to be in contact with bracket 10.

Figure 2:
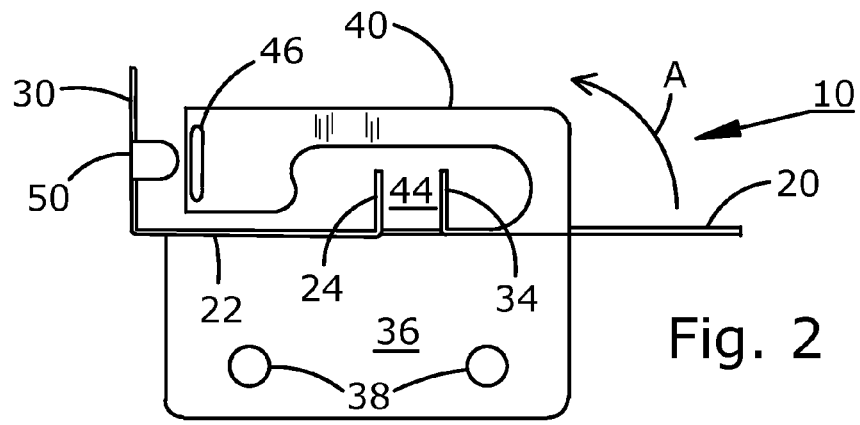
FIG. 2 is a front elevation view of the bracket of FIG. 1.
Figure 3:
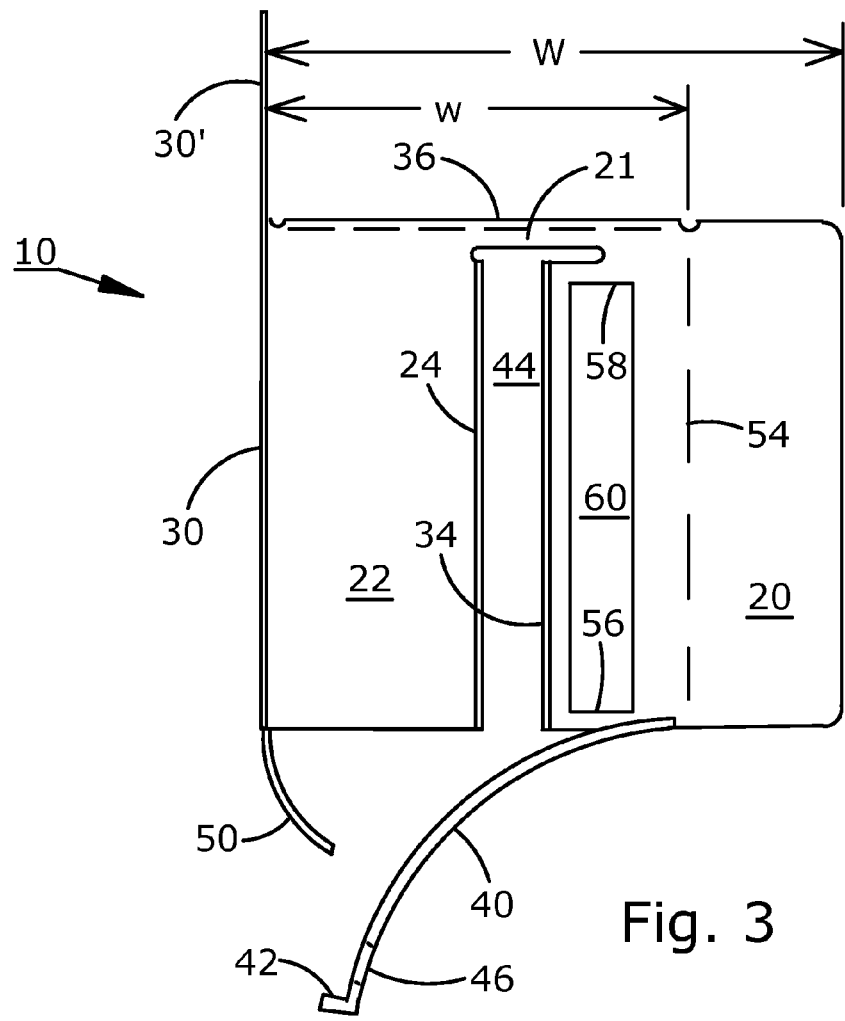
FIG. 3 is a top plan view of the bracket of FIG. 2.

Referring now to FIGS. 2 and 3, bracket 10 is shown in front elevation view and top plan view, respectively. As illustrated, strap 40 has been bent outwardly to open channel 44, and locking tab 50 has been bent to be in position to interlock with slot 46 when strap 40 is closed. At this stage one or more electrical conductors may be inserted into channel 44. The portion of strap 40 extending vertically upward from first plate 20 is relatively wide in the vertical direction, and the portion of strap 40 extending horizontally across the open end of channel 44 is relatively narrow. By forming the second portion relatively narrow, the second portion is easily bent to open and close channel 44. With the bend being along a curve as shown, the potential for metal bending fatigue and fracture is minimized. Barrier 24 and jaw 34 are seen in parallel relation and each in vertical orientation. The spacing between barrier 24 and jaw 34, i.e. channel 44, is sufficient to accommodate only a relatively small diameter conductor. Jaw 34 is connected to first plate 20 by a pair of strips 56 and 58 that are narrow enough to be bent around a curve to raise jaw 34 and thereby increase the space between barrier 24 and jaw 34 as will be described below. An opening 60 is formed between jaw 34, strips 56, 58, and first plate 20.

Continuing with FIGS. 2 and 3, a bend line 54 is formed in first plate 20 oriented parallel to the outer edge (right edge as shown) of first plate 20, and positioned a distance w from wall 30. Bend line 54 serves to divide first plate 20 into a first area and a second area. As seen in FIG. 1, bracket 10 has a width W that is substantially equal to the width W of stud 12, typically being 3.5 inches. However, certain studs may be narrower, on the order of 2.5 inches wide. When first plate 20 is bent along bend line 54 in the direction indicated by arrow A (FIG. 2), the resultant width w of bracket 10 is substantially 2.5 inches, thereby reconfiguring bracket 10 to accommodate a narrower stud and allowing the sheet rock wall surface to be mounted to the studs in close engagement and securely holding bracket 10. Bend line 54 may be formed by a series of linear score marks, a row of small punched holes through first plate 20 or other linear impressions able to ensure a reasonably clean linear bend.

Figure 4:
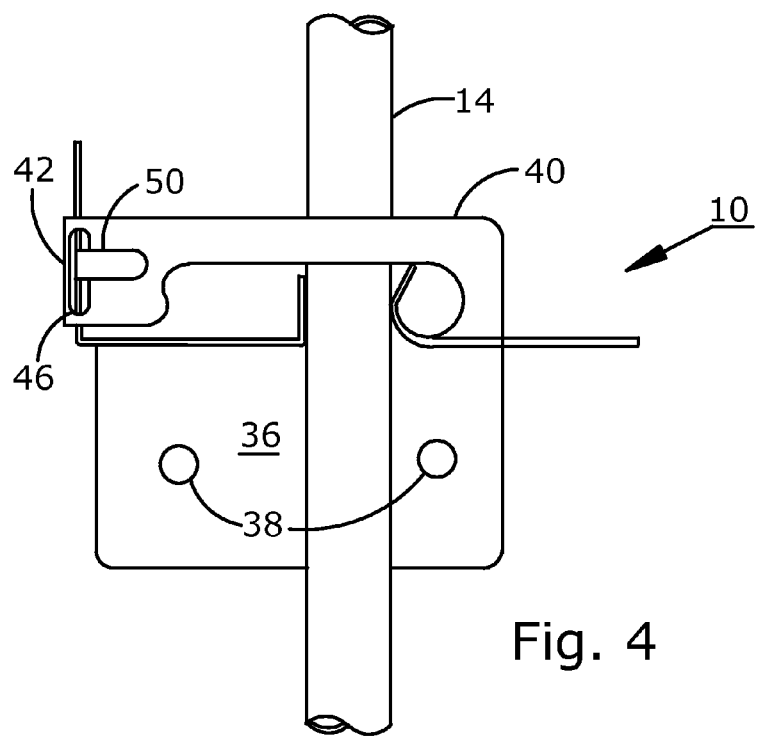
FIG. 4 is a front elevation view of the bracket of the present invention with a conductor mounted thereby.
Figure 5:
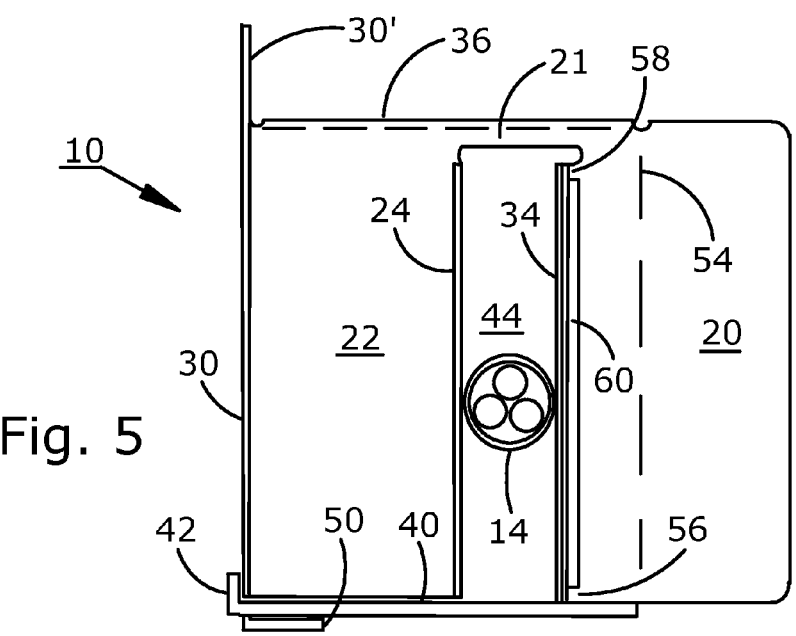
FIG. 5 is a top plan view of the bracket of FIG. 4.

Referring now to FIGS. 4 and 5, bracket 10 is shown in front elevation view and top plan view respectively. A conductor 14 has been inserted into channel 44 and strap 40 has been straightened to reside across the open end of channel 44. Return 42 snugly overlaps the adjacent edge of wall 30 with locking tab 50 passing through slot 46 and bent into a locking configuration. The engagement of return 42 with wall 30 and the engagement of locking tab 50 with slot 46 significantly enhances the rigidity and stability of bracket 10 as installed on a building stud by locking two intersecting vertical members to each other.

Referring further to FIGS. 4 and 5, it is seen that conductor 14 has a diameter larger than the initial spacing between barrier 24 and jaw 34 as shown in FIGS. 2 and 3. In order to accommodate the diameter of conductor 14, strips 56 and 58 have been bent to curve upwardly and position jaw 34 further from barrier 24. As will be understood, the relatively narrow width of strips 56 and 58 allow ready positioning of jaw 34, while the malleable nature of the sheet steel used to form bracket 10 causes jaw 34 to remain in the position to which it is placed. With jaw 34 positioned to bear against conductor 14, additional conductors may be placed and held within channel 44 prior to closing and locking strap 40. Conductor 14 and any additional conductors held in channel 44 are therefore positioned a fixed distance from the inner surface of a wall board to be mounted to a stud adjacent to bracket 10, the fixed distance being in compliance with the NEC regulations noted above.

Bracket 10 is preferably formed of galvanized sheet metal approximately 0.025 inch thick, i.e. 24 gauge. It is to be understood that alternate materials and thickness that satisfy the features described herein are usable.

While the description above discloses a preferred embodiment of the present invention, it is contemplated that numerous variations and modifications of the invention are possible and are considered to be within the scope of the claims that follow.

What is claimed is:

1. A stabilized bracket for holding conductors a fixed distance from a wall surface, comprising:
   a. a first plate;
   b. a second plate connected in coplanar relation to the first plate by a bridge, the second plate spaced apart from the first plate to form a channel with an open end for inserting a conductor;
   c. a foot connected to the first plate, the second plate and the bridge and oriented at a first angle thereto;
   d. a wall connected to the second plate at a first edge thereof and oriented at a second angle thereto;
   e. a strap mounted at a first end to the first plate and positionable across the channel open end for engaging an edge of the wall, the strap formed with a slot therethrough and an angularly oriented return formed adjacent to the slot;
   f. an anchor plate for attachment to a building stud, the anchor plate extending from an end of the wall opposed to the edge of the wall; and
   g. whereas, when the strap is positioned across the channel open end and engaging the edge of the wall, the bracket is substantially stabilized against displacement or distorting.

2. The stabilized bracket described in claim 1, wherein the strap is formed with a relatively wide portion and a relatively narrow portion, the relatively narrow portion being readily bendable to move the strap from an open position away from the open end of the channel to a closed position across the open end of the channel.

3. The stabilized bracket described in claim 1, further comprising a barrier formed in angular relation at a second edge of the second plate, the second edge being substantially parallel to the first edge.

4. The stabilized bracket described in claim 3, wherein the angular relation of the barrier to the second plate is substantially a 90° angle.

5. The stabilized bracket described in claim 3, further comprising a jaw connected in angular relation to the first plate and opposed to the barrier, the barrier and the jaw bordering the channel.

6. The stabilized bracket described in claim 5, wherein the jaw is connected to the first plate by a pair of relatively narrow strips.

7. The stabilized bracket described in claim 6, wherein the strips, the jaw and the first plate define an open window.

8. A stabilized bracket for holding conductors a fixed distance from a wall surface, comprising:
   a. a first plate divided into two areas separated by a bend line;
   b. a second plate connected in coplanar relation to the first plate by a bridge, the second plate spaced apart from the first plate to form a channel with an open end for inserting a conductor;
   c. a foot connected to the first plate, the second plate and the bridge and oriented at a first angle thereto;
   d. a wall connected to the second plate at a first edge thereof and oriented at a second angle thereto;
   e. a strap mounted at a first end to the first plate and positionable across the channel open end for engaging an edge of the wall, the strap formed with a slot therethrough and an angularly oriented return formed adjacent to the slot;
   f. an anchor plate for attachment to a building stud, the anchor plate extending from an end of the wall opposed to the edge of the wall;
   g. whereas, when the strap is positioned across the channel open end and engaging the edge of the wall, the bracket is substantially stabilized against displacement or distorting; and
   h. whereas, when the first plate is bent along the bend line, the bracket is configured for mounting to a building stud of relatively narrow width.

9. The stabilized bracket described in claim 8, wherein the bend line enables one of the two areas to be oriented at an angle to the other of the two areas.

10. The stabilized bracket described in claim 8, further comprising a locking tab formed on the edge of the wall in a manner for passing the locking tab through the slot when the strap is positioned across the open end of the channel.

11. The stabilized bracket described in claim 8, wherein the strap is formed with a relatively wide portion and a relatively narrow portion, the relatively narrow portion being readily bendable to move the strap from an open position away from the open end of the channel to a closed position across the open end of the channel.

12. The stabilized bracket described in claim 8, further comprising a barrier formed in angular relation at a second edge of the second plate, the second edge being substantially parallel to the first edge.

13. The stabilized bracket described in claim 12, wherein the angular relation of the barrier to the second plate is substantially a 90° angle.

14. The stabilized bracket described in claim 12, further comprising a jaw connected in angular relation to the first plate and opposed to the barrier, the barrier and the jaw bordering the channel.

15. The stabilized bracket described in claim 14, wherein the jaw is connected to the first plate by a pair of relatively narrow strips.

16. The stabilized bracket described in claim 15, wherein the strips, the jaw and the first plate define an open window.

17. A stabilized bracket for holding conductors a fixed distance from a wall surface, comprising:
   a. a first plate;
   b. a second plate connected in coplanar relation to the first plate by a bridge, the second plate spaced apart from the first plate to form a channel with an open end for inserting a conductor;
   c. a foot connected to the first plate, the second plate and the bridge and oriented at a first angle thereto;
   d. a wall connected to the second plate at a first edge thereof and oriented at a second angle thereto;
   e. a strap formed with a relatively wide portion and a relatively narrow portion, the relatively narrow portion being readily bendable to move the strap from an open position away from the open end of the channel to a closed position across the open end of the channel, the strap mounted at a first end to the first plate and positionable across the channel open end for engaging an edge of the wall, the strap further formed with an angularly oriented return;
   f. an anchor plate for attachment to a building stud, the anchor plate extending from an end of the wall opposed to the edge of the wall; and
   g. whereas, when the strap is positioned across the channel open end and engaging the edge of the wall, the bracket is substantially stabilized against displacement or distorting.

18. The stabilized bracket described in claim 17, further comprising a slot formed through the strap adjacent to the return and a locking tab formed on the edge of the wall in a manner for passing the locking tab through the slot when the strap is positioned across the open end of the channel.

19. The stabilized bracket described in claim 17, further comprising a barrier formed in angular relation at a second edge of the second plate, the second edge being substantially parallel to the first edge.

20. The stabilized bracket described in claim 19, further comprising a jaw connected in angular relation to the first plate and opposed to the barrier, the barrier and the jaw bordering the channel.

* * * * *